US009873516B2

(12) United States Patent
Burton et al.

(10) Patent No.: US 9,873,516 B2
(45) Date of Patent: Jan. 23, 2018

(54) LOW PROFILE PASS-THROUGH ELECTRICAL CONNECTOR

(71) Applicant: Battelle Memorial Institute, Columbus, OH (US)

(72) Inventors: Brett Burton, Columbus, OH (US); Andrew Cox, Columb, OH (US); Darren Wolfe, Hilliard, OH (US)

(73) Assignee: Battelle Memorial Institute, Columbus, OH (US)

( * ) Notice: Subject to any disclaimer, the term of this patent is extended or adjusted under 35 U.S.C. 154(b) by 26 days.

(21) Appl. No.: 13/908,885

(22) Filed: Jun. 3, 2013

(65) Prior Publication Data
US 2014/0015733 A1   Jan. 16, 2014

Related U.S. Application Data

(60) Provisional application No. 61/654,787, filed on Jun. 1, 2012.

(51) Int. Cl.
B64D 15/12 (2006.01)
H01B 7/00 (2006.01)
H05B 3/02 (2006.01)
B64C 1/36 (2006.01)
H01Q 1/28 (2006.01)

(52) U.S. Cl.
CPC ............... *B64D 15/12* (2013.01); *B64C 1/36* (2013.01); *H01B 7/00* (2013.01); *H05B 3/02* (2013.01); *H01R 2201/02* (2013.01); *H05B 2203/016* (2013.01); *H05B 2214/02* (2013.01);
(Continued)

(58) Field of Classification Search
CPC ........ H01R 43/20; H01R 2201/02; F41J 9/10; F41J 2/02; B64D 15/00; B64D 15/12; B64D 15/20; H01Q 1/28; H01Q 1/286; H01Q 1/281; H01Q 1/282; H01Q 1/287;
(Continued)

(56) References Cited

U.S. PATENT DOCUMENTS 5,248,265 A * 9/1993 Goto ................... H01R 13/5213
439/559
6,350,093 B1 * 2/2002 Petersen ............... F16B 33/002
411/178
(Continued)

FOREIGN PATENT DOCUMENTS

BE 513611 A 8/1952
BE 533533 A 12/1954
(Continued)

OTHER PUBLICATIONS

Speed of a Commercial Jet Airplane, Joby Josekutty—2002, 4 pages.*
(Continued)

Primary Examiner — Hoang Nguyen
Assistant Examiner — Awat Salih
(74) Attorney, Agent, or Firm — Frank Rosenberg

(57) ABSTRACT

A low profile pass-through electrical connector is designed for aerospace applications. The connector allows voltage and current to pass-thru a conductive wing surface, while maintaining a low profile height for aerodynamic performance considerations. Examples of applications of the electrical connector include power for thin film heaters and communication antennae applications.

13 Claims, 9 Drawing Sheets

(52) U.S. Cl.
CPC .... *Y10T 29/49016* (2015.01); *Y10T 29/49083* (2015.01); *Y10T 29/49826* (2015.01)

(58) Field of Classification Search
CPC .......... H01Q 1/285; H01Q 1/283; H01Q 1/27; F25B 47/02
USPC ..... 439/668, 578, 916; 342/6; 343/704, 705, 343/906; 244/134 A, 117 R, 134 R, 244/134 E
See application file for complete search history.

(56) References Cited

U.S. PATENT DOCUMENTS

| | | | |
|---|---|---|---|
| 8,834,208 B2* | 9/2014 | Strittmatter et al. | 439/668 |
| 9,623,975 B2* | 4/2017 | Burton | B64D 15/12 |
| 2013/0176186 A1* | 7/2013 | Yaccarino | H01P 1/387 |
| | | | 343/787 |

FOREIGN PATENT DOCUMENTS

| | | | |
|---|---|---|---|
| DE | 10 2004 042423 A1 | | 3/2006 |
| FR | 2933378 A1 | | 1/2010 |
| GB | 666609 | * | 6/1949 |
| GB | 6666609 | * | 6/1949 |
| GB | 666609 | * | 7/1950 |
| GB | 666609 | | 2/1952 |

OTHER PUBLICATIONS

Speed of a Commercial Jet Airplane, by Josekutty (2002).*
EP Search report dated Sep. 26, 2014 in EP Application No. 13002841.8.
Official Action dated May 16, 2016 in EP Application No. 13002841.8.

* cited by examiner

LOW PROFILE PASS-THROUGH ELECTRICAL CONNECTOR

RELATED APPLICATION

This application claims priority to U.S. provisional patent application Ser. No. 61/654,787, filed 1 Jun. 2012.

STATEMENT OF GOVERNMENT INTEREST

The work was conducted with funding from the U.S. government through Contract No. FA8650-09-D-5601. The government has certain rights in the invention.

SUMMARY OF THE INVENTION

The present invention is directed toward a low profile pass-thru connector for passing electrical voltage and current through a conductive wing surface, which are typically made of carbon fiber or aluminum. Preferably, the connector maintains a low profile height with respect to the wing surface, to maintain the wing's aerodynamic performance. The pass-thru connector may provide power to thin film heaters used for anti-icing/de-icing purposes, and can alternatively (or in combination) be utilized for other purposes such as communication antennas. Thin film heaters may require high electrical currents, so the pas s-thru connector must have sufficient cross-sectional area where it travels through the wing to prevent overheating. However, it also should make a transition to a thin conductive (preferably copper) strip conductor to interface with the thin film heaters. This thin copper strip does not overheat with high current use because the airflow during flight keeps it cool due to forced convection. In one variant, the total thickness of the thin film heater cannot be more than 0.020 inches (0.51 mm), and to this end, the thin copper leads for this application are preferably 0.005 inches (0.013 mm) thick or less.

The invention includes any of the designs described herein including generalizations of these designs, portions of each design, as well as combinations of the designs. The invention also includes methods of making conductive assemblies and/or flying vehicles comprising the conductive assemblies. A nonlimiting list of the inventive concepts includes:

In one aspect, the invention provides a conductive assembly, comprising: a heating element or antenna; an electrically conductive pin that is electrically connected to the heating element or antenna; a mating socket that is adapted to mate with the conductive pin; and an electrically insulating sleeve disposed around the circumference of the pin and/or mating socket.

In another aspect, the invention provides a flying vehicle (such as a missile or manned or unmanned aircraft) comprising the conductive assembly disposed on an aerodynamic surface (preferably a wing) wherein the heating element or antenna is disposed on the exterior surface of the flying vehicle and the electrically conducting pin and mating socket form an electrical pathway from the exterior of the flying vehicle to the interior (for example, from the surface of a wing to the interior of the wing). In some preferred embodiments, there is no solder on the conductive pin. In some preferred embodiments, the electrically insulating sleeve comprises a threaded polymer and the pin is a screw-type pin that is adapted to screw through the threaded polymer.

The invention also includes a method of making a conductive assembly or flying vehicle comprising any of the assembly steps described herein. In some embodiments, a conductive assembly comprising a heating element (in some embodiments, a plurality of heating elements) or an antenna and having one or (usually) more conductive pins is pressed through aperture(s) formed by an electrically insulating sleeve(s) that is (are) disposed in and pass through the surface of an airfoil. The electrically conductive pin(s) mate with a socket(s) to form an electrical pathway through the airfoil surface. In some preferred embodiments, no solder is required to install the conductive assembly on the airfoil surface.

In another aspect, the invention provides a method of conducting electricity from the inside to the outside of an airfoil (or vice versa), that comprises passing electricity through the electrically conductive pin. In a preferred embodiment, this method is conducted while a fluid passes over the surface of the airfoil at a velocity of at least 200 mph (320 km). This condition would typically be encountered during flight but would not be experienced by a structure on the ground.

In a further aspect, the invention provides a flying vehicle comprising an airfoil (such as a wing) comprising a conductive wire passing from the inside of the airfoil to the outside of the airfoil and an insulating sleeve disposed around the conductive wire. Preferably, the insulating sleeve is fit by compression into the airfoil. In some embodiments, the conductive wire is a screw that has a flat head that conforms to the surface of the airfoil.

DETAILED DESCRIPTION OF THE INVENTION

In one embodiment, the invention provides a low profile pass-through electrical connector that connects or is adapted for connecting an electrical conductor on an outer surface of a plane wing to conductors in the interior of the plane wing, comprising: a conductive pin (e.g., a brass pin of 12-14 gauge); a non-conducting vented fastener for receiving the pin; a captive nut configured to thread around the fastener in the interior of the wing; a non-conductive sheath; a micro jack connector press fit into the non-conductive sheath; and a wire.

Figure 1:
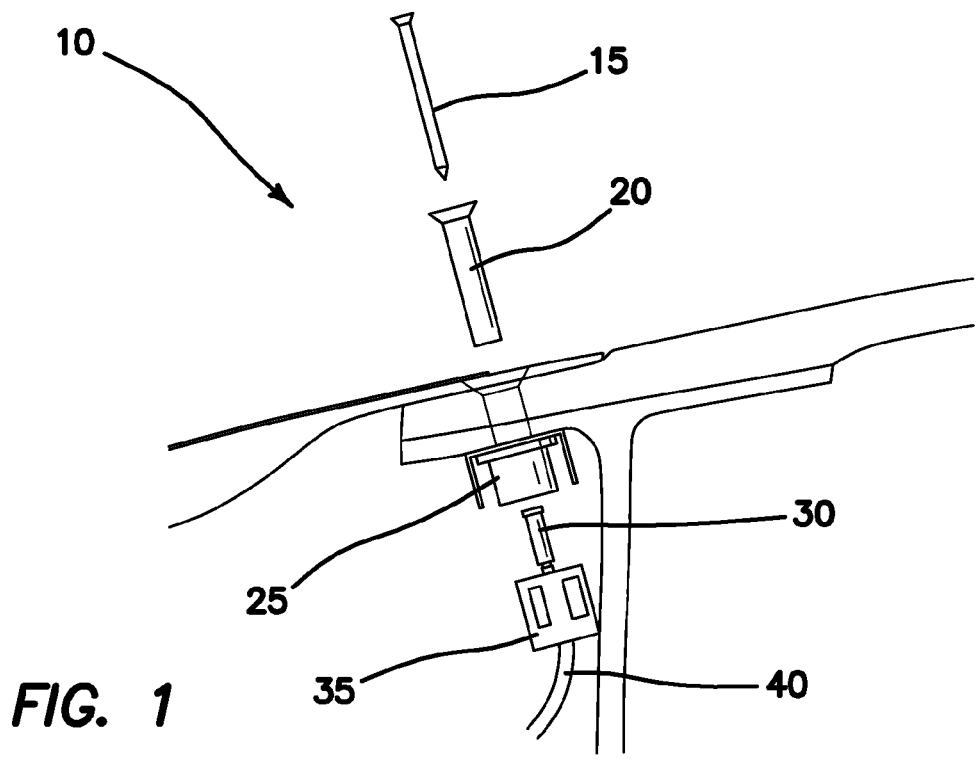
FIGS. 1-3 illustrate a low profile pass-through electrical connector comprising an electrically conductive pin passing through a non-conductive sheath.
Figure 2:
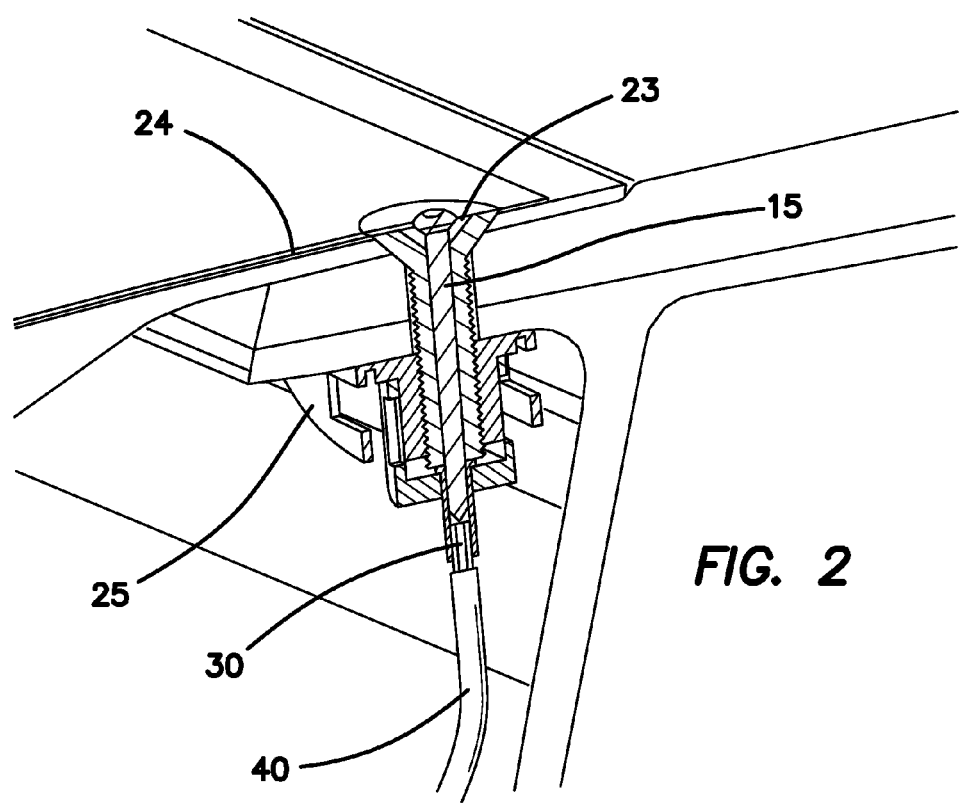
Figure 3:
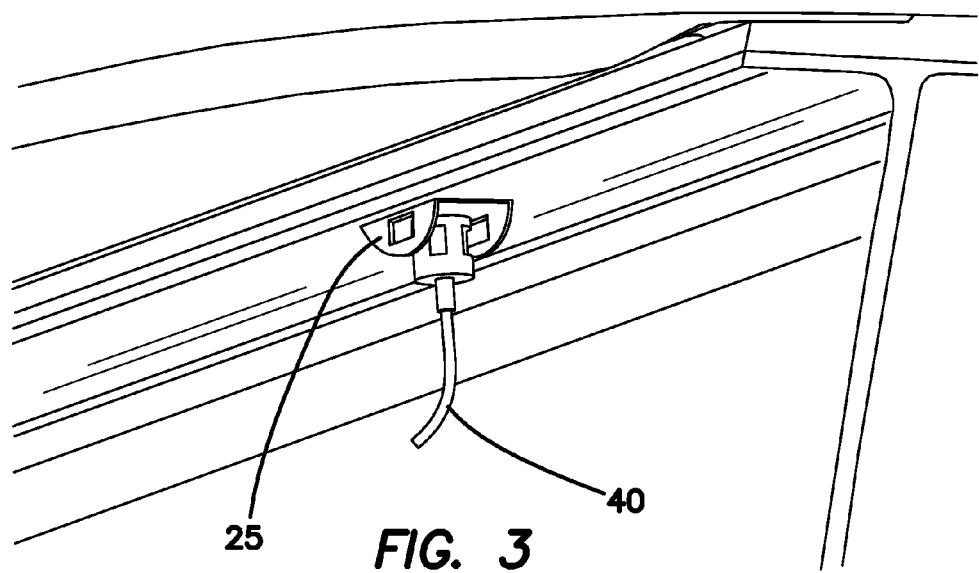

Referring to FIGS. 1-3, a low profile pass-through electrical connector 10 comprises: a conductive brass pin 15 of 12-14 gauge; a ¼-20 size (¼ inch diameter, 20 threads per inch; 0.64 cm diameter, 8 threads per cm) non-conducting vented fastener 20 that has been modified for fitment of a brass conductor; a captive nut 25; a micro-jack connector 30, press fit into the non-conductive sheath; a non-conductive sheath 35; and a wire 40. FIG. 2 illustrates a cutaway view of the assembled pass through connector, with a solder joint 23 where the thin copper lead 24 connects to the head of the 12-gauge pin. FIG. 3 is a bottom view of the pass through connector assembly.

Figure 4:
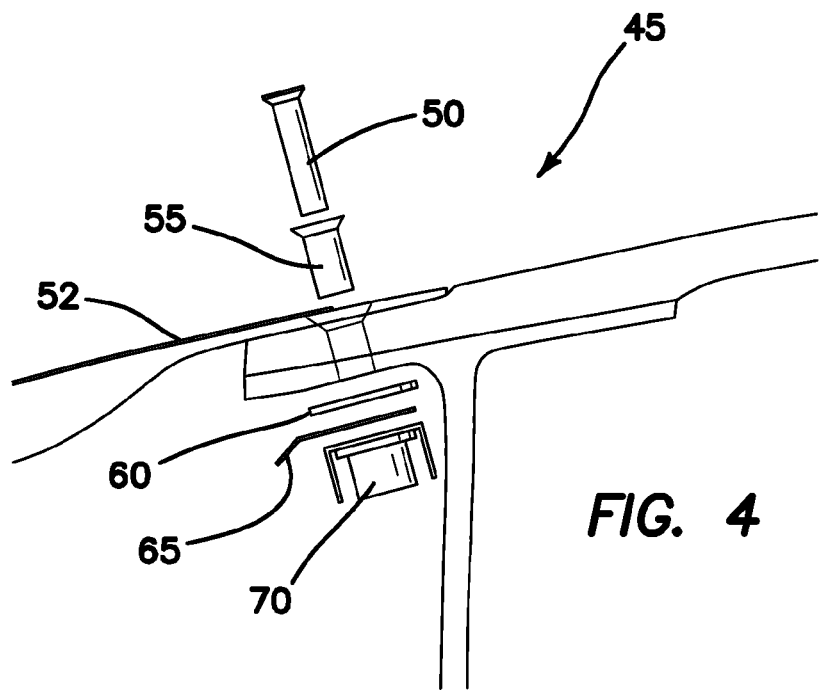
FIGS. 4-6 illustrate a low profile pass-through electrical connector in which a copper lead is sandwiched between a steel screw and an insulating sleeve.
Figure 5:
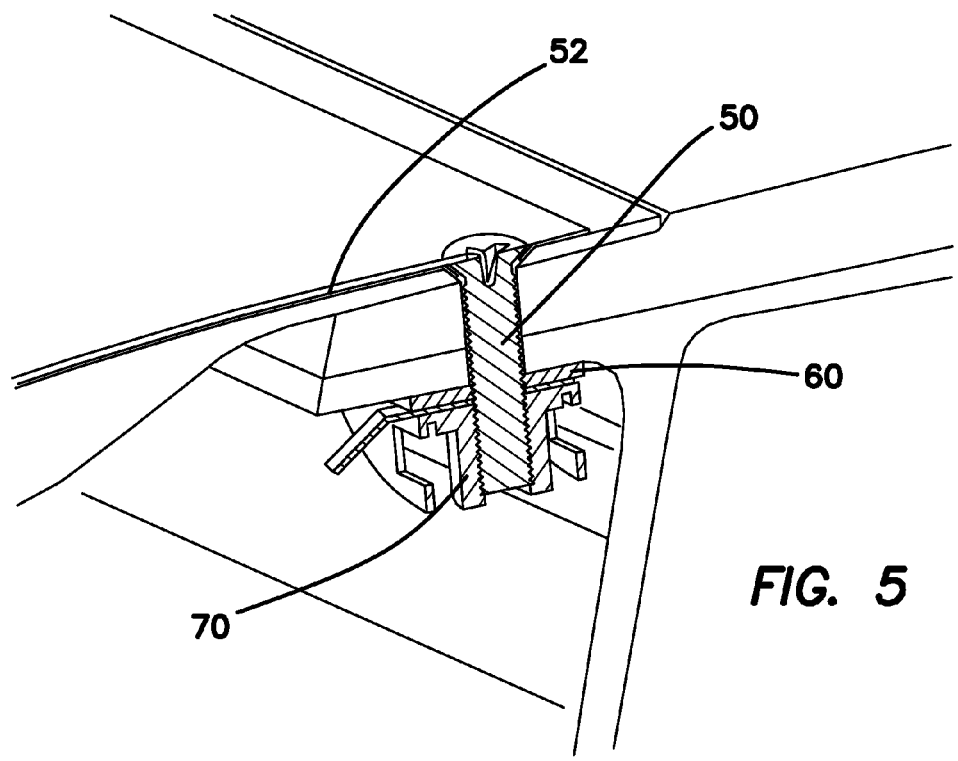
Figure 6:
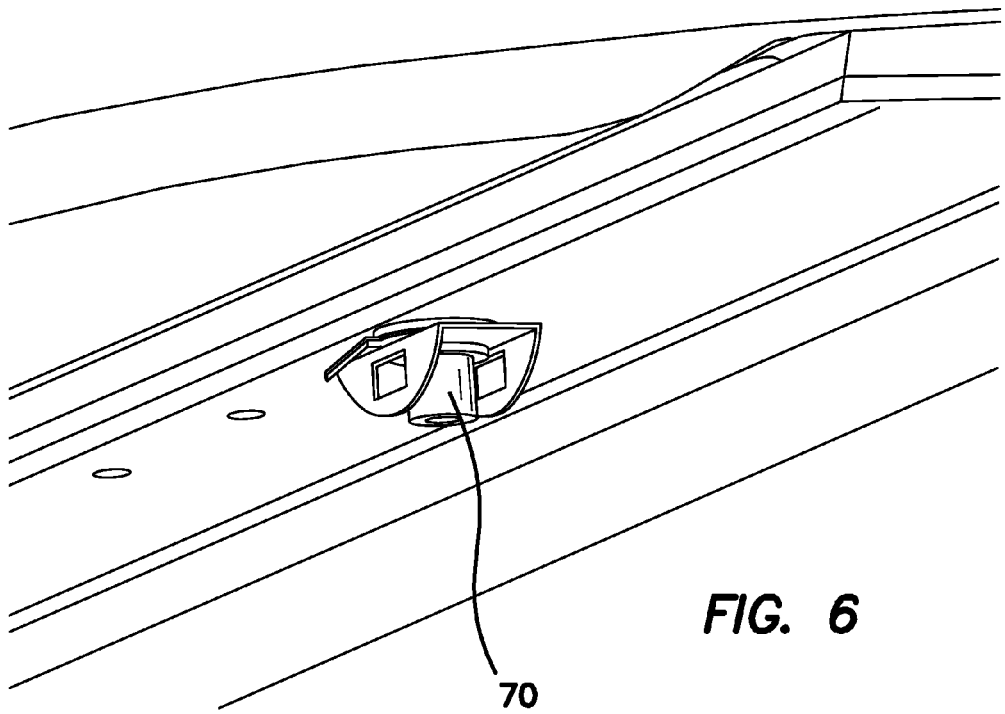

In another embodiment, referring to FIGS. 4-6, a low profile pass through electrical connector 45 comprises: a number 10, 100-degree ($25/64$ inch, 0.99 cm nominal diameter, 100-degree is the angle formed by the tapered screw head) flat-head stainless steel screw 50; a wide flange nylon insulating sleeve 55; a wide nylon insulating washer 60; a copper ring terminal with solder flange 65; and a captive nut 70. FIG. 4 is an exploded view and FIG. 5 is a cutaway view of an assembled connector. The thin copper lead 52 is sandwiched between the head of the screw and the nylon sleeve in this concept to complete the electrical connection. This obviates the need for a solder joint.

Figure 7:
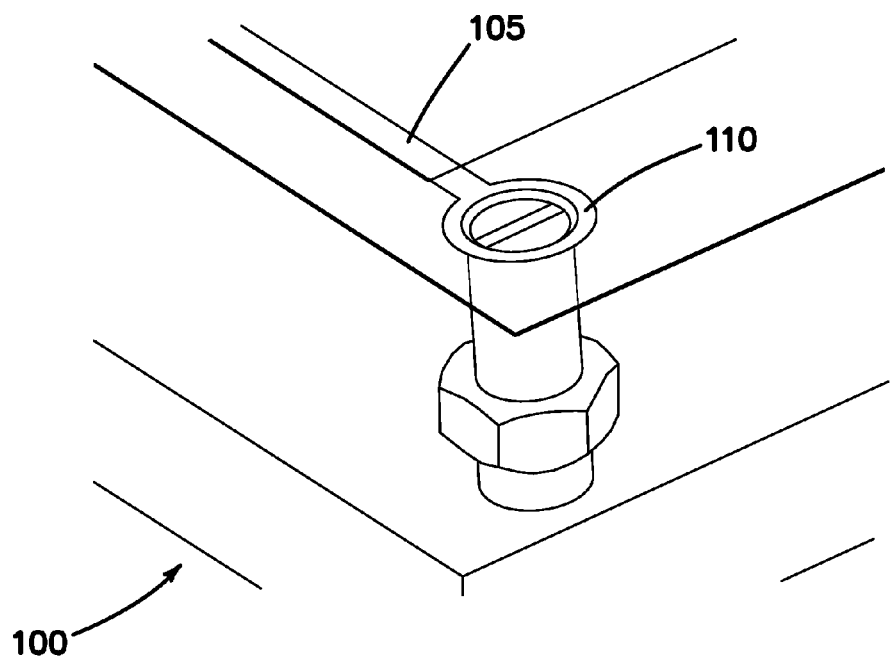
FIGS. 7-9 illustrate a low profile pass-through electrical connector in which the use of a conductive screw avoids the use of solder to fasten the conductive lead.
Figure 8:
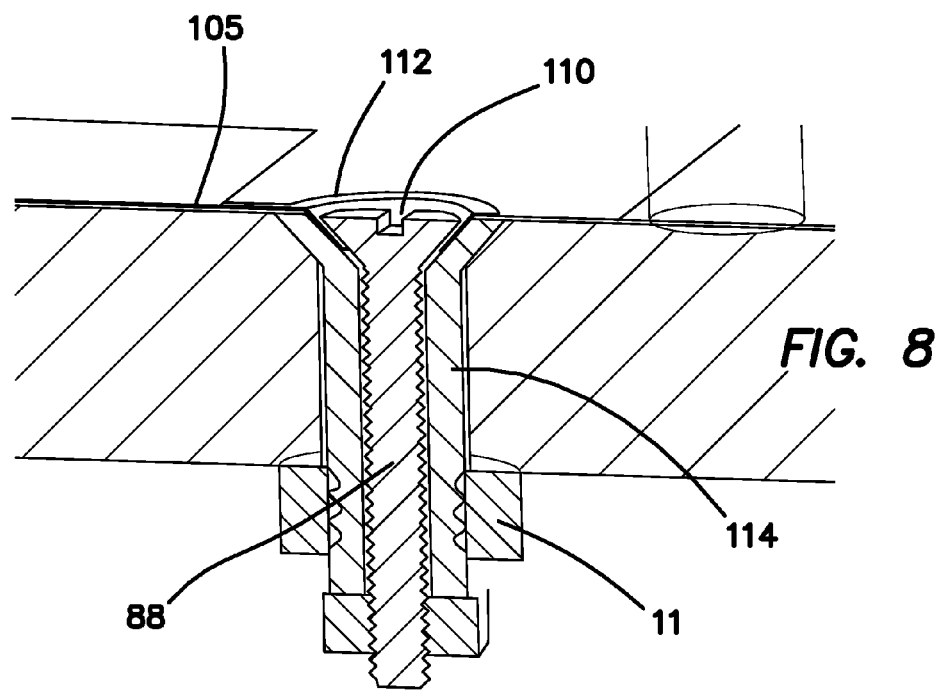
Figure 9:
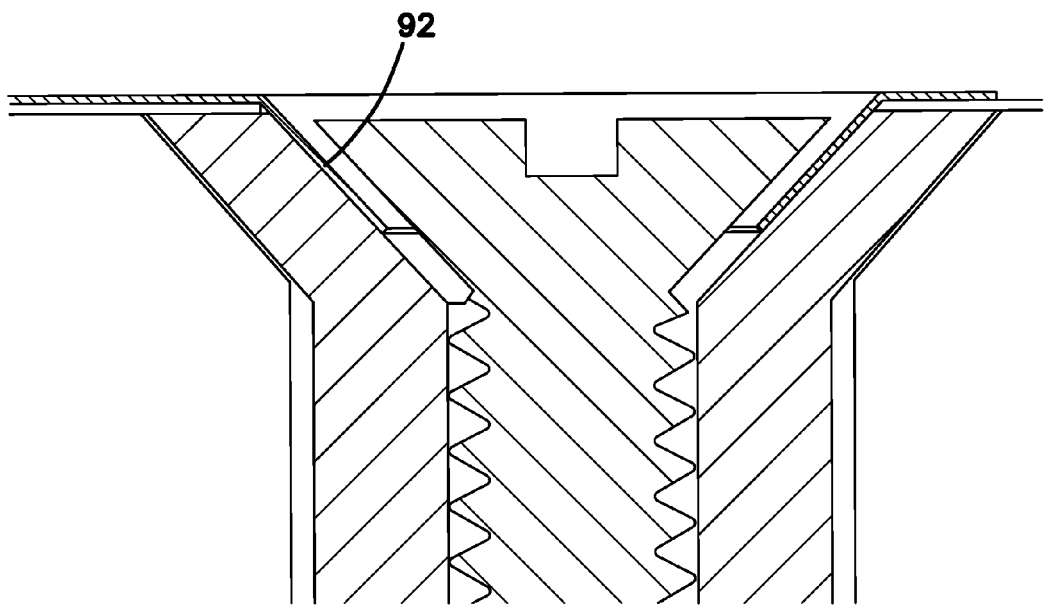

In a further variant, referring to FIGS. 7-9, a low profile pass through electrical connector 100 comprises a copper lead 105 that has been cut with an eyelet shaped feature 110 on one end. This eyelet shape is then swaged into a countersink shape. The countersunk eyelet provides for a large contact area for the thin copper lead.

FIGS. 7-9 illustrate a compression connection without the need for any solder connections. This design uses a polymer insulating insert 114, made from a material such as Noryl™, that is fastened to the wing surface by means of a threaded nut 11. The head of the insert has a countersink shape 112, which allows it to mount flush to the wing surface with a countersunk hole in the wing. The inside of the insert 114 is also threaded, and a conductive screw 88 (such as aluminum) is threaded into it as the pass-thru conductor. The screw also has a countersunk head, which sandwiches the countersink shape of the swaged copper lead 92 into the head of the insulating insert. FIG. 7 is a top view, FIG. 8 is a cutaway view and FIG. 9 is a close-up cutaway showing the compression fit.

In another example, referring to FIGS. 10-13, the low profile pass-through electrical connection comprises:
155—a flattened conductive lead (preferably copper).
160—conductive pin.
165—electrically insulating sleeve.
170—conductive socket for mating with the conductive pin.
175—electrical power wire.

FIGS. 10-13 illustrate a mated pin and socket connection. MIL-SPEC (United States military specifications) pins and sockets improve the shock- and vibration-resistance of the connection. The mated pin 160 and socket 170 connection uses a comparatively smaller area, allowing a greater density of connections to be made. This can improve the performance of the thin film heater by allowing a higher resolution of individual heater control. Lastly, the thin film heater 195 can be removed and replaced without having to undo any internal wiring connections since the socket is fastened to the insert.

Figure 10:
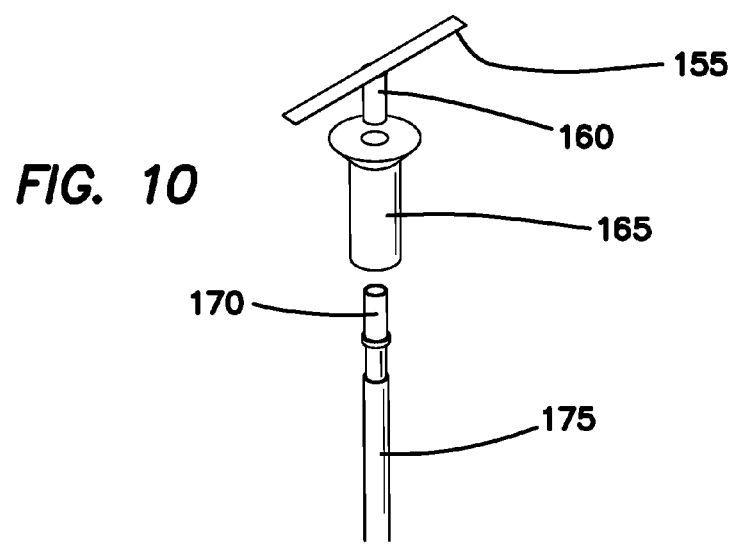
FIGS. 10-13 illustrate a low profile pass-through electrical connector comprising a pin and socket.
Figure 11:
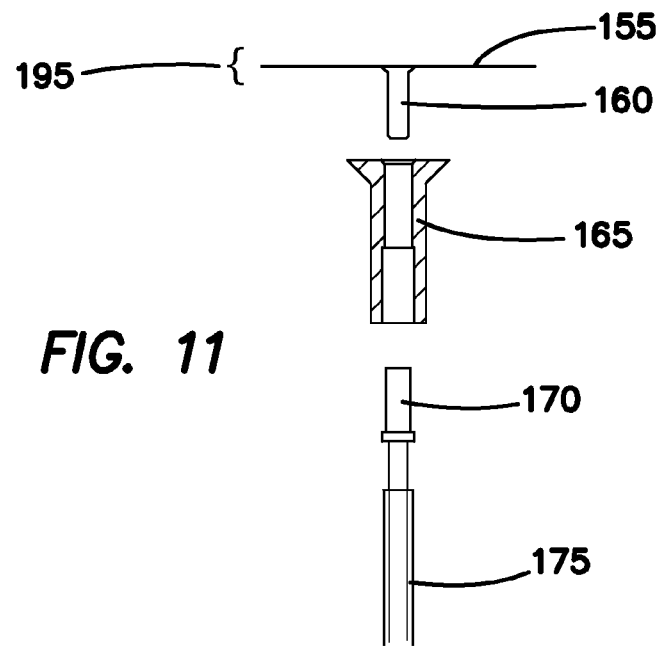
Figure 12:
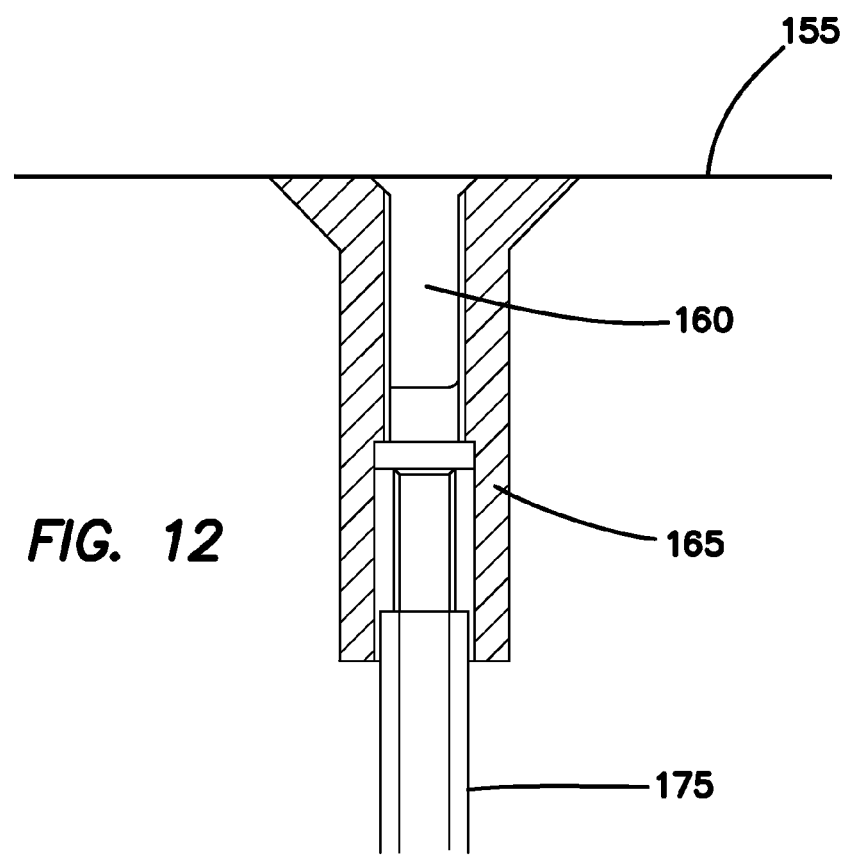
Figure 13:
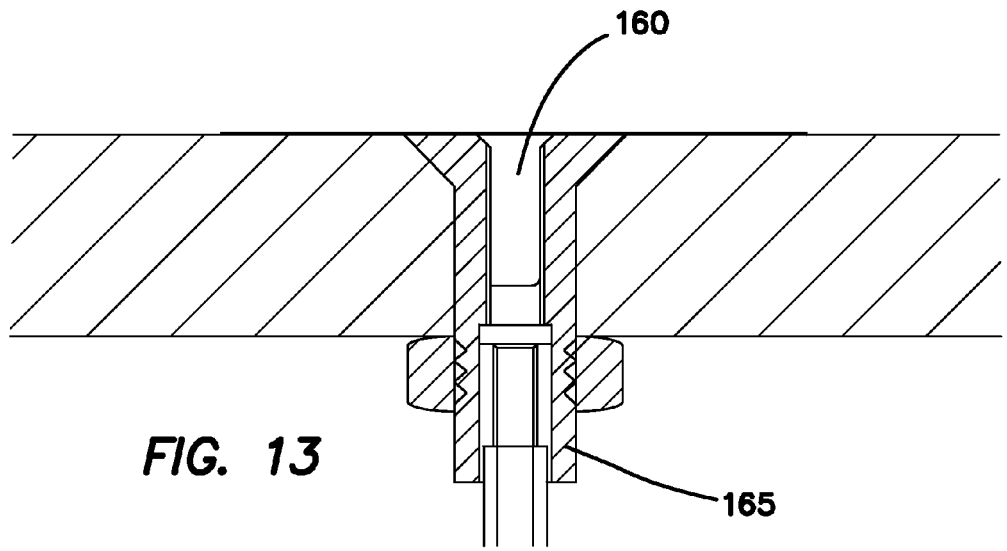

FIG. 10 illustrates a mating receptacle in an exploded view. FIG. 11 is an exploded cutaway view, and FIG. 12 is an illustration of a mated pin and socket cutaway. FIG. 13 shows a cutaway of the complete thin film heater assembly, including the wing section.

Figure 14:
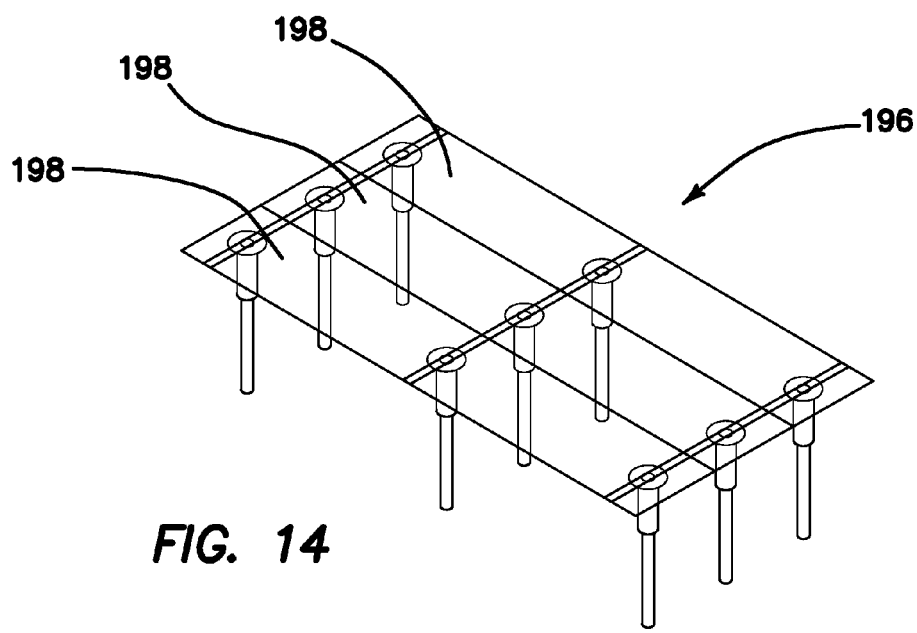
FIG. 14 illustrates an assembly comprising multiple thin film heaters stacked in close proximity.

FIG. 14 illustrates a heater and pass-thru assembly 196 illustrating multiple thin film heaters 198 can be stacked in close proximity using a tiled approach with a pass-thru connector design.

FIGS. 15-18 illustrate example embodiments of the low profile pass through electrical connection comprising a mated pin and socket connection.

Figure 15:
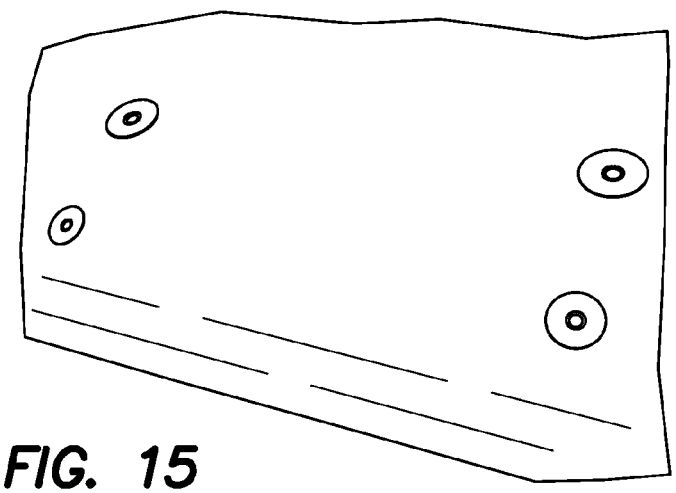
FIGS. 15-18 show photographs of low profile pass-through electrical connectors.

FIG. 15 is a photograph of insert receptacle assemblies installed in a wing surface.

Figure 16:
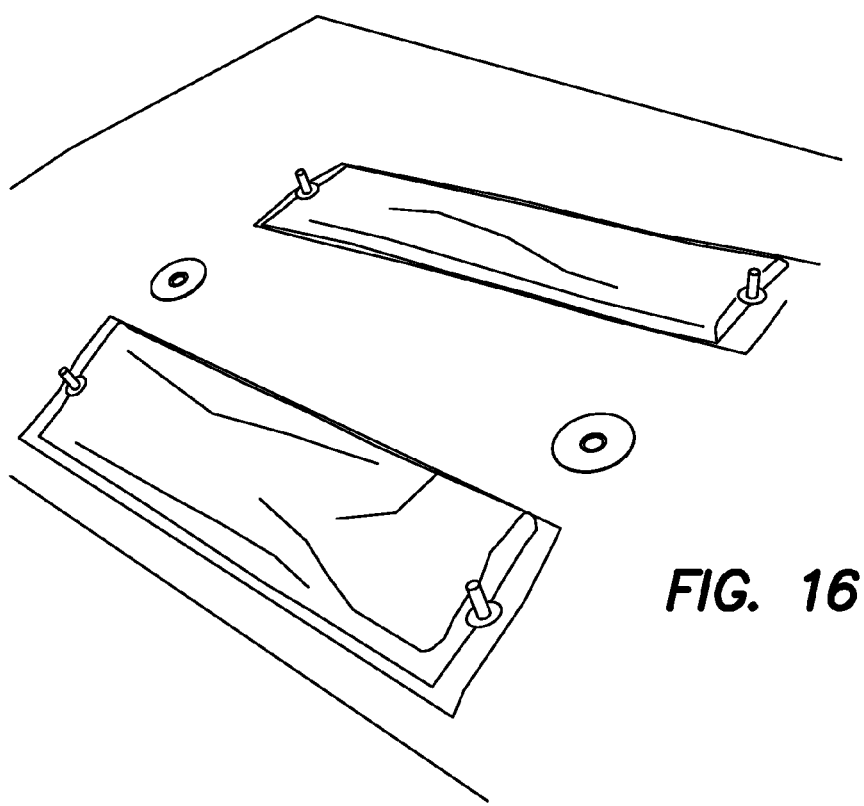

FIG. 16 is a photograph of thin film heaters with a pin mating interface.

Figure 17:
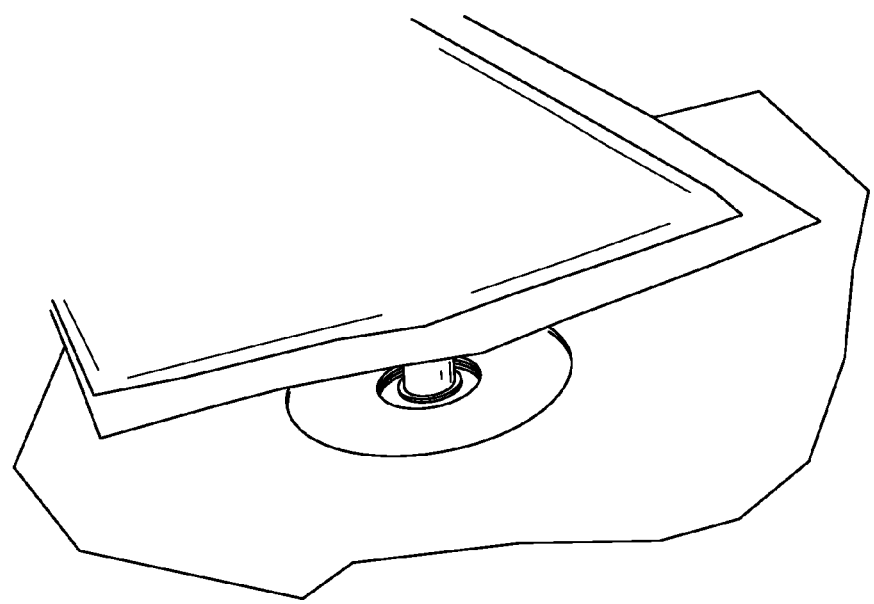

FIG. 17 illustrates a mating of pin with insert receptacle.

Figure 18:
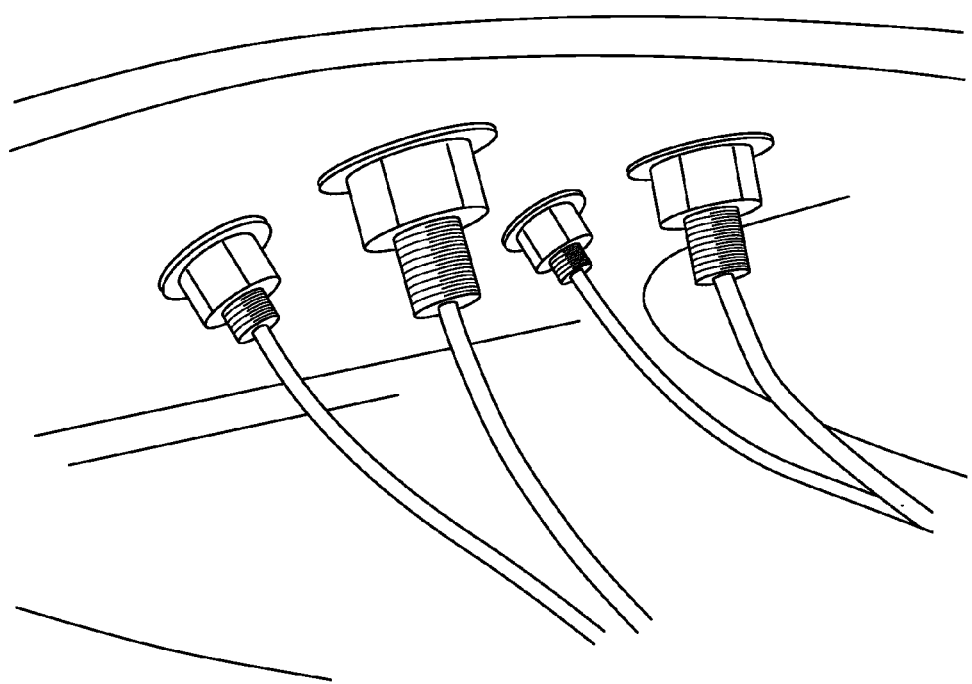

FIG. 18 is a photograph of an inside of a wing showing pass-thru receptacle wiring.

While various embodiments of the present invention have been described above, it should be understood that they have been presented by way of example only, and are not intended to limit the invention.

What is claimed:

1. A flying vehicle comprising a conductive assembly disposed on an aerodynamic surface, the conductive assembly, comprising:
  a heating element or antenna;
  an electrically conductive pin that is electrically connected to the heating element or antenna;
  a mating socket that is adapted to mate with the conductive pin; and
  an electrically insulating sleeve disposed around the circumference of the pin or mating socket; wherein the electrically insulating sleeve comprises a conically-shaped countersunk aperture;
  wherein the heating element or antenna is disposed on the exterior surface of the flying vehicle and the electrically conducting pin and mating socket form an electrical pathway from the exterior of the flying vehicle to the interior;
  wherein the electrically insulating sleeve comprises a threaded polymer and the pin is a screw-type pin that is adapted to screw through the threaded polymer; and
  wherein a lead is sandwiched between the head of the screw and the electrically insulating sleeve.

2. The flying vehicle of claim 1 wherein the flying vehicle is a missile or unmanned aircraft.

3. A method of conducting electricity from the inside to the outside of an airfoil or vice versa, comprising: passing electricity through the electrically conductive pin of the conductive assembly of claim 1.

4. The method of claim 3 wherein fluid is passing over the surface of the airfoil at a velocity of at least 200 mph.

5. The flying vehicle of claim 1 wherein the aerodynamic surface comprises a countersunk hole wherein the head of the electrically insulating sleeve is mounted flush to the aerodynamic surface.

6. A flying vehicle comprising a wing and the electrical pathway extends from the surface of the wing to the interior of the wing; and further comprising a conductive assembly, wherein the conductive assembly comprises a heating element;
  an electrically conductive pin that is electrically connected to the heating element;
  a mating socket that is adapted to mate with the conductive pin; and
  an electrically insulating sleeve disposed around the circumference of the pin or mating socket;
  wherein the electrically insulating sleeve conforms to a conically-shaped countersunk aperture that is disposed in the wing;
  wherein the electrically conductive pin is press fit into the electrically insulating sleeve;
  wherein the heating element is a thin film heater; and
  wherein the thin film heater attached to the conductive pin can be removed from the socket and replaced without having to undo any wiring in the interior of the wing.

7. The flying vehicle of claim 6 wherein the wing comprises a countersunk hole wherein the head of the electrically insulating sleeve is mounted flush to the wing surface.

8. A method of making a flying vehicle comprising a heating element or an antenna, comprising:
   pressing a conductive assembly comprising a heating element or an antenna and having one or more conductive pins through one or more apertures formed by one or more electrically insulating sleeves that is disposed in and pass through the surface of an airfoil, wherein the conductive pin comprises a head that is adjacent to the heating element or the antenna; wherein the heating element or the antenna are in the form of a layer and wherein the conductive pin comprises a central axis that is orthogonal to the plane of the layer where the pin's head is adjacent to the heating element or the antenna;
   wherein the electrically conductive pins mate with one or more sockets to form an electrical pathway through the airfoil surface; and
   wherein, during the step of pressing, the central axis of the conductive pin remains orthogonal to the plane of the layer where the pin's head is adjacent to the heating element or the antenna; and wherein the heating element or antenna that is attached to the conductive pin can be removed from the socket and replaced without having to undo any wiring in the interior of the wing.

9. A method of making a flying vehicle comprising a heating element or an antenna, comprising:
   pressing, without screwing, a conductive assembly comprising a heating element or an antenna and having one or more conductive pins through one or more apertures formed by one or more electrically insulating sleeves that is disposed in and pass through the surface of an airfoil, wherein the conductive pin comprises a head on the end opposite to the end that mates with the socket, and wherein the heating element or antenna overlies the head;
   wherein the electrically conductive pins mate with one or more sockets, without screwing, to form an electrical pathway through the airfoil surface.

10. The method of claim 9 wherein the conductive assembly comprises a plurality of heating elements.

11. The method of claim 10 wherein the assembly comprises a plurality of electrically conductive pins that mate with a plurality of sockets.

12. A flying vehicle, comprising: an airfoil comprising a heating element connected to a conductive pin that passes from the inside of the airfoil to the outside of the airfoil and an insulating sleeve disposed around the conductive pin, wherein the insulating sleeve is fit by compression into the airfoil, and wherein the conductive pin is press fit into the insulating sleeve;
   wherein the heating element is a thin film heater; and wherein the thin film heater attached to the conductive pin can be removed from the socket and replaced without having to undo any wiring in the interior of the wing.

13. The flying vehicle of claim 12 wherein the airfoil comprises a wing wherein the wing comprises a conically-shaped countersunk hole, wherein the insulating sleeve is disposed in the conically-shaped countersunk hole, and wherein the head of the insulating sleeve is mounted flush to the wing surface.

\* \* \* \* \*